(No Model.)
W. C. MILROY & J. H. HOAK.
LISTER CULTIVATOR.
No. 429,541. Patented June 3. 1890.
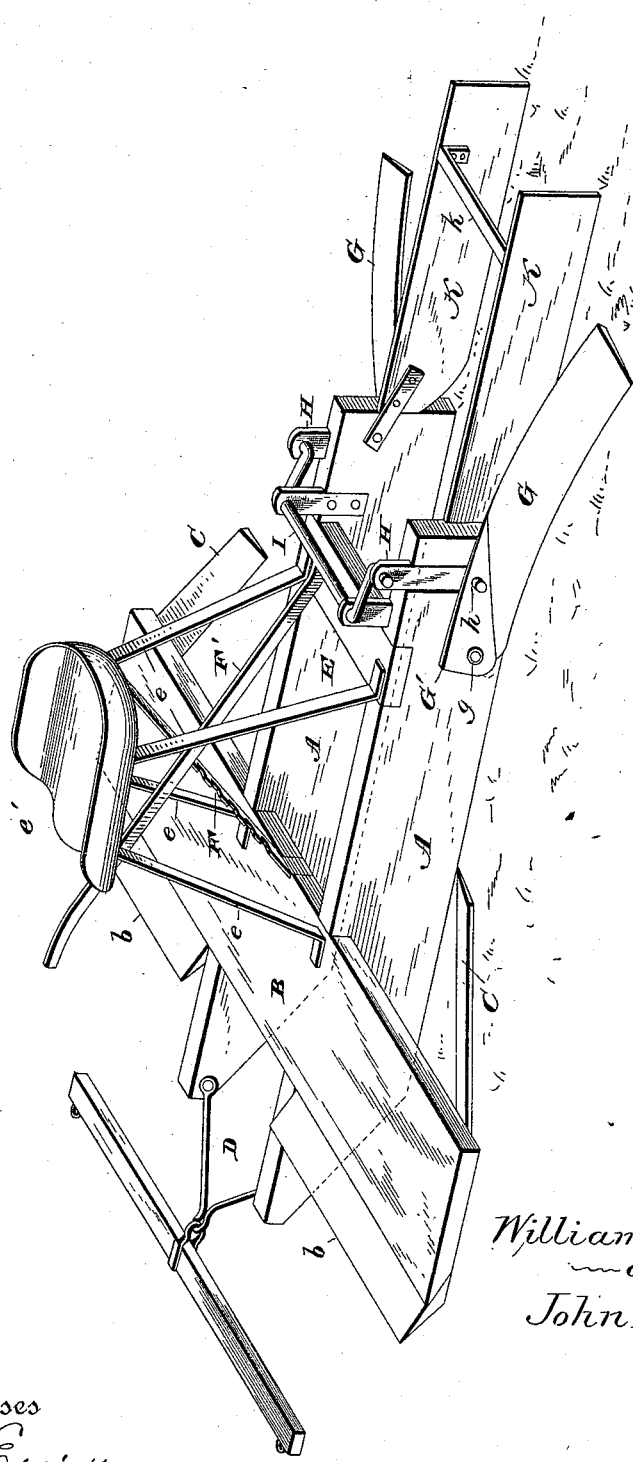
Witnesses
William C. Milroy
— and —
John H. Hoak.
Inventors
By his Attorney 

UNITED STATES PATENT OFFICE.

WILLIAM C. MILROY AND JOHN H. HOAK, OF SHICKLEY, NEBRASKA.

LISTER CULTIVATOR.

SPECIFICATION forming part of Letters Patent No. 429,541, dated June 3, 1890.

Application filed April 3, 1890. Serial No. 346,430. (No model.)

*To all whom it may concern:*

Be it known that we, WILLIAM C. MILROY and JOHN H. HOAK, citizens of the United States of America, residing at Shickley, in the county of Fillmore and State of Nebraska, have invented certain new and useful Improvements in Lister Cultivators; and we do hereby declare the following to be a full, clear, and exact description of the invention, such as will enable others skilled in the art to which it appertains to make and use the same, reference being had to the accompanying drawing, and to letters of reference marked thereon, which form a part of this specification.

Our invention relates to certain new and useful improvements in cultivators for listed corn.

The object of the invention is to provide a simple, substantial, and effective cultivator upon which the operator may ride, the same being provided with means for adjusting the main blades, so that they will enter the ground to the desired depth and cultivate the soil and destroy the weeds upon the tops and sides of the ridges between which the corn is planted.

In the accompanying drawing, the figure is a perspective view of a lister corn-cultivator constructed in accordance with our improvement.

A A refer to the runners, which are rigidly connected to each other by a cross-bar B, which extends for a considerable distance beyond the sides thereof, said cross-bar having rigidly attached to its front edges beyond the runners strips $b$, which extend slightly upwardly, as shown, to provide the front cross-bar with an enlarged beveled edge, which will force the weeds and plants beneath the same without breaking them.

To the rear outer edge of the cross-bar B are rigidly secured knives C, which converge toward the runners, the front edges thereof being sharpened. The body or operating portion of these knives curve downwardly at an angle so that they will enter the soil and loosen the same.

A draft-clevis D is secured to the front end of the runners, to which a whiffletree is attached, so that two horses may be used in connection therewith, said horses walking between the rows or in front of the knives and cultivators. The runners A are also connected to each other by a short cross-piece E, which is rigidly bolted to the frame, and the cross-pieces B and E serve as supports for legs $e$, which sustain the driver's seat $e'$. Beneath the driver's seat, from the rear edge thereof extending downwardly and forwardly to the rear edge of the cross-piece B, is a rack-bar F.

G refers to the cultivator-blades, which are pivotally attached by bolts $g$ to the runners, and rear of these pivot-bolts the outer edges of the runners are recessed, in which lie links H, the lower ends of which are provided with outwardly-projecting studs which engage with perforations $h$ in the vertical portions of the cultivating-blades G, while through the upper ends of the links pass the outer ends of a crank-shaft I, to which the end of a lever F' is rigidly secured, said lever being adapted to engage with the rack-bar F to hold the cultivator-blades raised or lowered, as may be desired. These cultivator-blades G are made of a single piece of metal and have vertical portions G' which lie parallel with the runners, while the balance of said blades are bent outwardly and extend rearwardly therefrom, the front edges being slightly lower than the rear edges. These blades are also curved in the direction of their length to conform to the ridges. It will be observed that the front knives converge toward the runners while the rear cultivator-blades diverge therefrom; also, that the front knives incline downwardly while the cultivator-blades are nearly horizontal.

To the rear ends of the runners are loosely pivoted fenders K K, the rear ends of which are connected by a cross-bar $k$. When the device is not in use, these fenders are tilted up to rest against the driver's seat.

In transporting the device, when it is not desired to use the same as a lister-cultivator, the lever can be depressed to its full extent to elevate the cultivator-blades, so that they will be out of contact with the soil, and when passing over plain surfaces neither the knives or blades will contact therewith.

We are aware that prior to our invention lister cultivators have been provided with a front cross-bar, beneath which the weeds pass, and rear adjustable cultivating-blades; also, that fenders have been rigidly secured to the rear end of the runners; and therefore we do not claim such construction as our invention; but What we do claim as new, and desire to secure by Letters Patent, is—

1. In a lister corn-cultivator, the combination of the parallel runners rigidly secured to each other by cross-bars, the front cross-bar extending beyond the runners and provided at its front edge with upturned strips, knives C, secured to the outer end of said front cross-bar, the blades being bent at an angle therewith, so as to extend downwardly toward the runners while they converge toward the same longitudinally, diverging cultivator-blades having straight vertical portions, which are pivotally secured to the runners, and links connecting said cultivating-blades with a crank-shaft mounted on the runners, said crank-shaft having an operating-lever, substantially as set forth.

2. The combination, in a lister corn-cultivator, of the parallel runners connected to each other by cross-bars, as shown, the front cross-bar extending beyond said runners and provided with knives the rear ends of which converge toward said runners, said knives being attached to the cross-bar so that their inner or cutting edges will be below the plane of their outer edges, cultivating-blades G, pivotally attached to the rear ends of the runners, said cultivating-blades having a vertical portion and a curved body portion, the outer or cutting edge being below the plane of the rear edges, said blades being curved longitudinally and connected to an adjusting-lever, and fenders K, pivotally attached to the rear end of the runners, the parts being organized substantially as shown, and for the purpose set forth.

In testimony whereof we affix our signatures in presence of two witnesses.

WILLIAM C. MILROY.
JOHN H. HOAK.

Witnesses:
HARRY PATEE,
C. W. PRICE.